(12) United States Patent
Han

(10) Patent No.: US 9,437,847 B2
(45) Date of Patent: Sep. 6, 2016

(54) BATTERY PACK

(75) Inventor: Jung-Yeop Han, Yongin (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 922 days.

(21) Appl. No.: 13/011,604

(22) Filed: Jan. 21, 2011

(65) Prior Publication Data

US 2011/0305930 A1 Dec. 15, 2011

(30) Foreign Application Priority Data

Jun. 9, 2010 (KR) .................. 10-2010-0054500

(51) Int. Cl.
| | |
|---|---|
| H01M 2/12 | (2006.01) |
| H01M 2/24 | (2006.01) |
| H01M 10/02 | (2006.01) |
| H01M 2/10 | (2006.01) |
| H01M 2/20 | (2006.01) |
| H01M 10/625 | (2014.01) |
| H01M 10/6561 | (2014.01) |
| H01M 10/613 | (2014.01) |

(52) U.S. Cl.
CPC ........... *H01M 2/105* (2013.01); *H01M 2/1077* (2013.01); *H01M 2/202* (2013.01); *H01M 10/613* (2015.04); *H01M 10/625* (2015.04); *H01M 10/6561* (2015.04)

(58) Field of Classification Search
None
See application file for complete search history.

(56) References Cited

U.S. PATENT DOCUMENTS

| | | | |
|---|---|---|---|
| 5,866,276 A | 2/1999 | Ogami et al. | |
| 7,014,949 B2* | 3/2006 | Kanai et al. | 429/148 |
| 7,642,004 B2* | 1/2010 | Shimoyama | 429/120 |
| 2001/0046624 A1 | 11/2001 | Goto et al. | |
| 2005/0064280 A1* | 3/2005 | Watanabe et al. | 429/120 |
| 2006/0057460 A1* | 3/2006 | Matthias et al. | 429/175 |
| 2007/0148536 A1 | 6/2007 | Kang et al. | |
| 2007/0264562 A1 | 11/2007 | Kang et al. | |
| 2009/0061301 A1 | 3/2009 | Planck | |
| 2009/0191452 A1 | 7/2009 | Anantharaman et al. | |
| 2010/0209759 A1 | 8/2010 | Rejman et al. | |
| 2011/0135993 A1* | 6/2011 | An et al. | 429/156 |

FOREIGN PATENT DOCUMENTS

| | | |
|---|---|---|
| JP | 9-86188 A | 3/1997 |
| JP | 2001325996 | 11/2001 |

(Continued)

OTHER PUBLICATIONS

The Korean Office action issued by Korean Industrial Property Office on Aug. 18, 2011, corresponding to KR10-2010-0054500 and Request for Entry attached herewith.

(Continued)

*Primary Examiner* — Barbara Gilliam
*Assistant Examiner* — Adam A Arciero
(74) *Attorney, Agent, or Firm* — Robert E. Bushnell, Esq.

(57) ABSTRACT

A battery pack includes a battery group including battery rows consecutively disposed adjacent to each other, with the battery rows including secondary batteries disposed parallel to each other and spaced apart from each other, a frame for surrounding the battery group, and a plurality of first ribs that are each disposed between adjacent battery rows. The first ribs include supporting grooves that are formed in lateral surfaces of the first ribs and accommodate portions of edges of the secondary batteries, and ends of each of the first ribs are coupled to the frame.

15 Claims, 6 Drawing Sheets

(56) References Cited

FOREIGN PATENT DOCUMENTS

| | | |
|---|---|---|
| JP | 2008047301 A | 2/2008 |
| JP | 2008047488 A | 2/2008 |
| JP | 2009123398 | 6/2009 |
| KR | 1020070075711 | 7/2007 |
| KR | 20070117334 A | 12/2007 |

OTHER PUBLICATIONS

Korean Office Action issued Apr. 2, 2012 in connection with Korean Patent Application Serial No. 10-2010-0054500 and Request for Entry of the Accompanying Office Action attached herewith.

* cited by examiner

BATTERY PACK

CLAIM OF PRIORITY

This application makes reference to, incorporates into this specification the entire contents of, and claims all benefits accruing under 35 U.S.C. §119 from an application earlier filed in the Korean Intellectual Property Office filed on Jun. 9, 2010 and there duly assigned Serial No. 10-2010-0054500.

BACKGROUND OF THE INVENTION

1. Field of the Invention

One or more embodiments of the present invention relate to battery packs, and more particularly, to battery packs in which secondary batteries are supported by ribs formed on a frame surrounding the secondary batteries, thereby maintaining stable assembly of the secondary batteries.

2. Description of the Related Art

A battery pack is installed in apparatuses such as electric bikes, or motorbikes.

SUMMARY OF THE INVENTION

One or more embodiments of the present invention provide improved battery packs.

One or more embodiments of the present invention provide battery packs in which stable assembly of secondary batteries is maintained.

One or more embodiments of the present invention provide battery packs in which secondary batteries are efficiently cooled.

One or more embodiments of the present invention provide battery packs in which secondary batteries are easily assembled.

Additional aspects will be set forth in part in the description which follows and, in part, will be apparent from the description, or may be learned by practice of the presented embodiments.

According to one or more embodiments of the present invention, a battery pack may be constructed with a battery group including battery rows consecutively disposed adjacent to each other, with the battery rows including secondary batteries disposed parallel to each other and spaced apart from each other; a frame for surrounding the battery group, and a plurality of first ribs that are each disposed between adjacent battery rows. The first ribs include supporting grooves that are formed in lateral surfaces of the first ribs and accommodate portions of edges of the secondary batteries, and ends of each of the first ribs are coupled to the frame.

Each of external surfaces of the first ribs may be inwardly spaced apart from each of side surfaces of the frame.

The supporting grooves may be formed offset from each other on the lateral surfaces of the first ribs, and the secondary batteries of adjacent battery rows are arranged in a zigzag form.

The first ribs may extend in a direction in which the battery rows extend.

Adjacent first ribs may include a ventilation path for circulating air. The ventilation paths are connected to the ends of the first ribs and connected to the frame.

The frame may include a plurality of ventilation holes for connecting air inside of the frame and air outside of the frame.

The battery pack may further include a plurality of second ribs that are each disposed between adjacent battery rows at second end portions of the secondary batteries and correspond to the first ribs. The second ribs include supporting grooves that are formed in lateral surfaces of the second, ribs and accommodate edges of the second end portions of the secondary batteries, and ends of the second rib are coupled to the frame. The first ribs are disposed so as to support edges of first end portions of the secondary batteries.

The secondary batteries may have a cylindrical shape, and each supporting groove may have a curved shape corresponding to a portion of an external circumferential surface of one secondary battery.

First external surfaces of the first ribs may correspond to the first end portions of the secondary batteries and may be inwardly spaced apart from a first side surface of the frame corresponding to the first end portions of the secondary batteries, and second external surfaces of the second ribs may correspond to the second end portions of the secondary batteries and may be inwardly spaced apart from a second side surface of the frame corresponding to the second end portions of the secondary batteries.

The battery pack may further include first connection taps for electrically connecting portions of the first end portions of the secondary batteries, and second connection taps for electrically connecting portions of the second end portions of the secondary batteries.

The battery pack may further include supporting protrusions that are coupled to external surfaces of the first ribs, wherein the supporting protrusions may extend over the supporting grooves so as to support portions of the first end portions of the secondary batteries.

The battery pack may further include a plurality of third ribs that are each disposed at intermediate portions of the secondary batteries and correspond to the first ribs and the second ribs. The third ribs include supporting grooves for supporting portions of edges of the secondary batteries, and ends of the third ribs are coupled to the frame.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
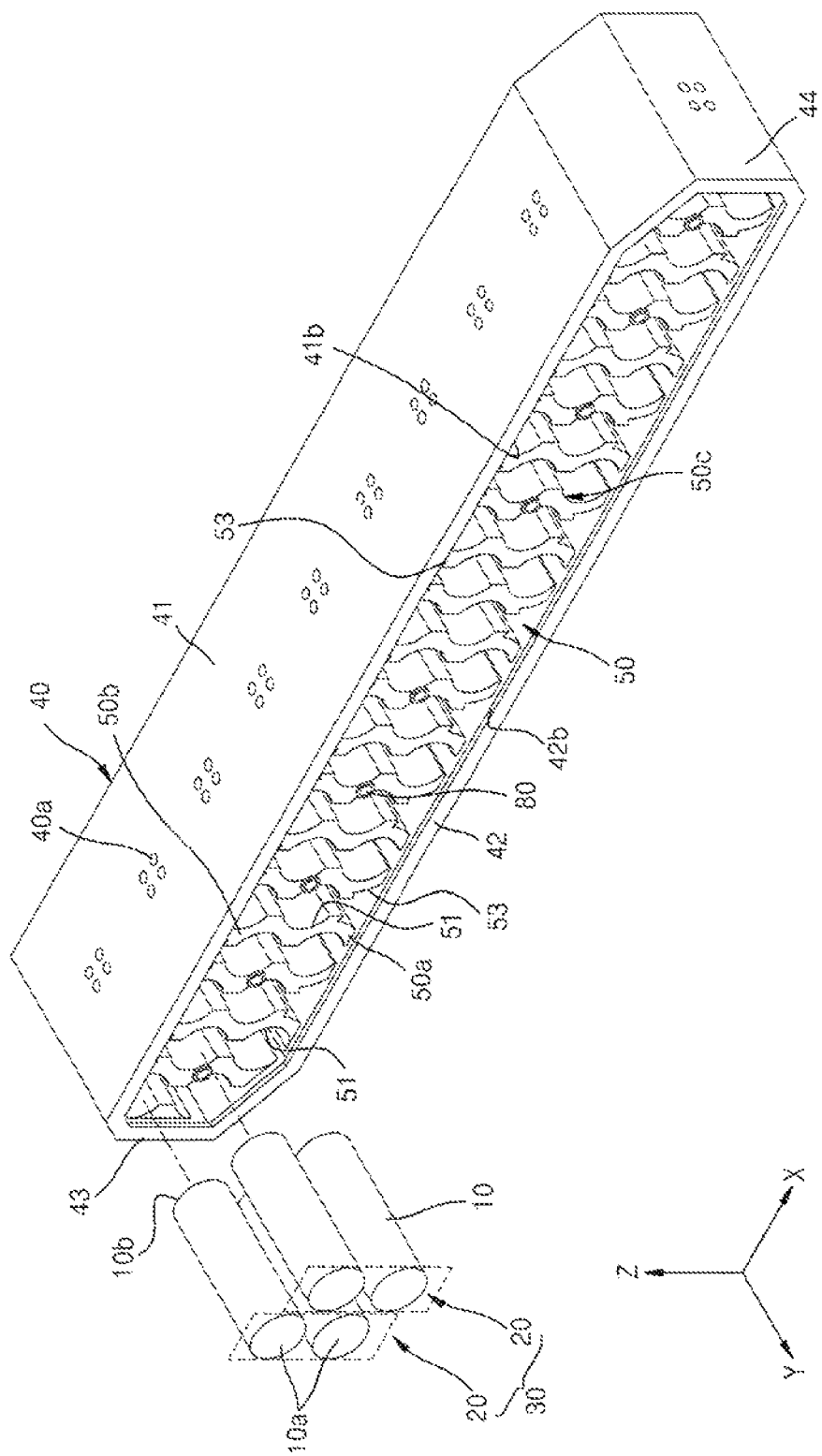
FIG. 1 is an exploded oblique view of an assembling structure of a battery pack constructed as an embodiment according to the principles of the present invention.

A battery pack including a plurality of assembled secondary batteries is installed in apparatuses such as electric bikes, or motorbikes.

Since secondary batteries may be heated due to heat generated during an operation of a battery pack, the lifetime of the secondary batteries may be reduced if the heat is not efficiently dissipated. Since external shocks and vibrations are transferred to a battery pack when vehicles containing the battery pack are driven, stable assembly of secondary batteries included in the battery pack needs to be maintained. In addition, when a battery pack is manufactured by assembling a plurality of secondary batteries, the secondary batteries are electrically connected before the secondary batteries are completely assembled. In this case, since the secondary batteries may not be fixed, or may be dissembled, operators may experience inconvenience during the assembling of the secondary batteries.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Figure 2:
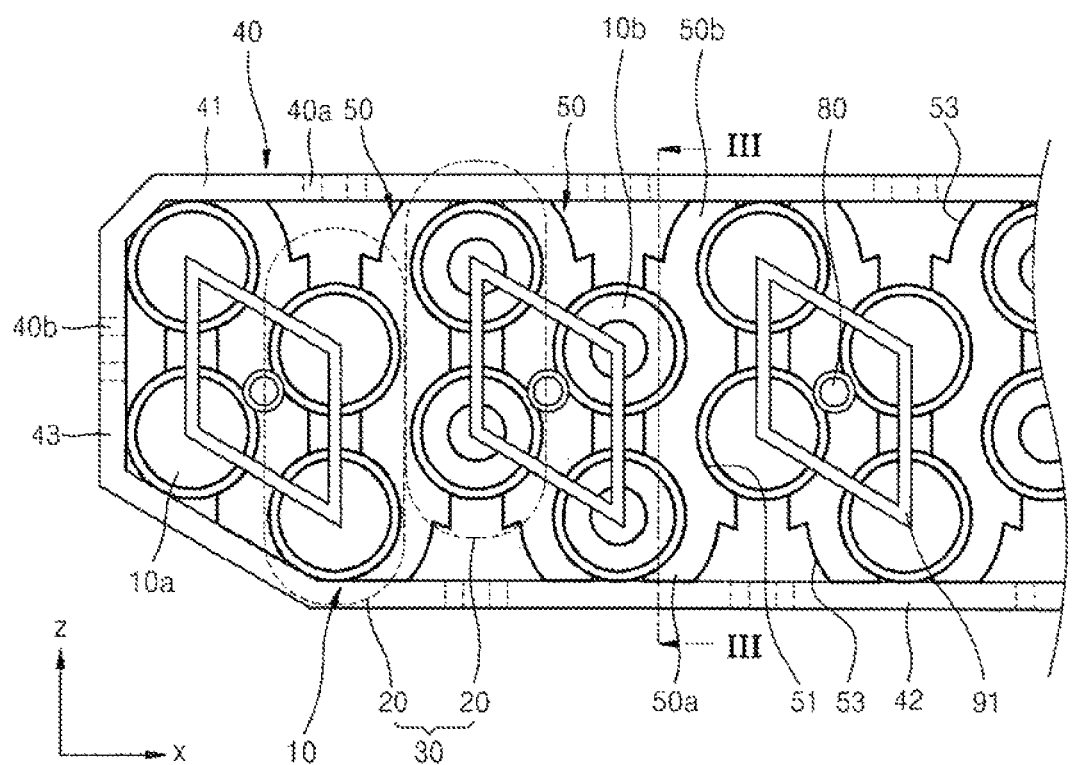
FIG. 2 is a front view of the battery pack of FIG. 1 for explaining a state in which assembling of the battery pack of FIG. 1 is completed.
Figure 3:
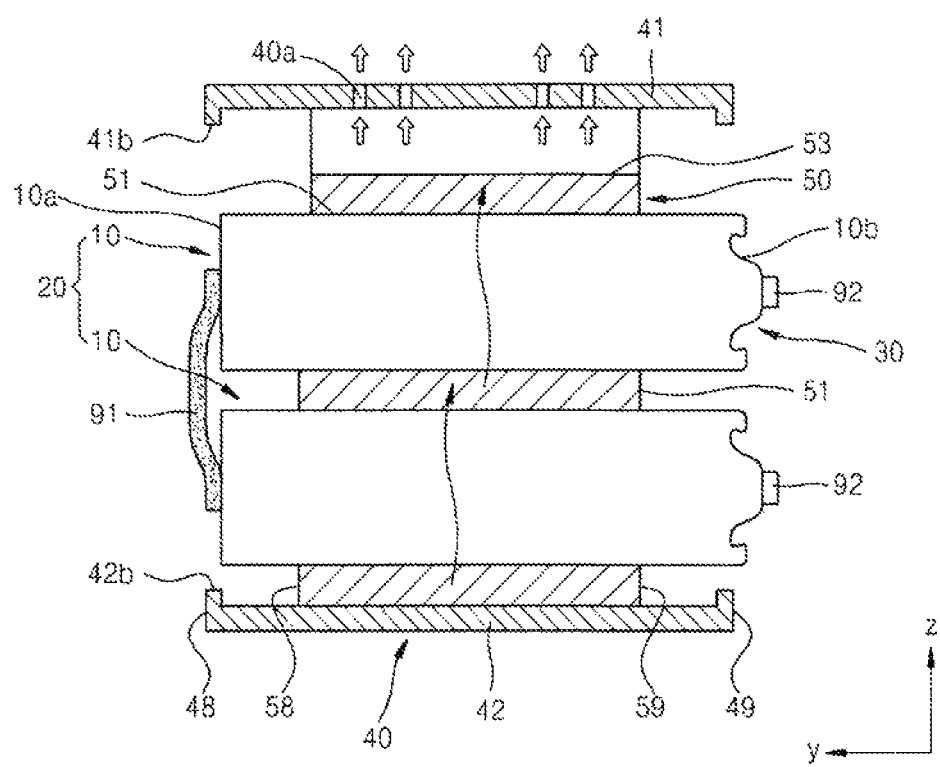
FIG. 3 is a cross-sectional view of the battery pack taken along sectional line III-III of FIG. 2.

FIG. 1 is an exploded oblique view of an assembling structure of a battery pack constructed as an embodiment according to the principles of the present invention. FIG. 2 is a front view for explaining a state in which assembling of the battery pack of FIG. 1 is completed. FIG. 3 is a cross-sectional view of the battery pack taken along a line of FIG. 2.

The battery pack constructed as the present embodiment includes a battery group 30 including a plurality of secondary batteries 10, a frame 40 surrounding battery group 30, and first ribs 50 installed on frame 40 so as to support secondary batteries 10.

Frame 40 includes a first side plate 41 as an upper plate in FIGS. 1, 2, and 3, a second side plate 42 corresponding to first side plate 41, and lateral plates 43 and 44 that respectively connect opposite ends of first side plate 41 to opposite ends of second side plate 42. Since an empty space surrounded by first side plate 41, second side plate 42, and lateral plates 43 and 44 is formed in frame 40, although secondary batteries 10 are installed in frame 40, lateral surfaces of secondary batteries 10 contact air, and thus secondary batteries 10 may be efficiently cooled.

Frame 40 may be formed of an electric insulating material such as plastic. In addition, frame 40 may be formed by shaping a metallic material such as aluminum (Al) into a frame form and then coating an electric insulating material onto a surface of the frame form.

First ribs 50 for supporting secondary batteries 10 are disposed in frame 40. First ribs 50 are spaced apart from each other in a direction in which frame 40 extends. First ribs 50 include supporting grooves 51 that are formed on lateral surfaces 50c of first ribs 50 so as to accommodate at least a portion of secondary batteries 10. In the present specification and the pending claims, the term "lateral surfaces 50c of first ribs 50" refers to the surfaces of the first ribs that are parallel to and facing each other, and are disposed along the Y-axis direction as shown in FIG. 1. First ends 50b of first ribs 50 are coupled to first side plate 41 of frame 40, and second ends 50a of first ribs 50 are coupled to second side plate 42 of frame 40.

Frame 40 and first ribs 50 may be formed integrated together by using a plastic injection method, but the present embodiment is not limited thereto. That is, frame 40 and first ribs 50 may be integrated together by forming frame 40 and then coupling first ribs 50 to frame 40. In order to couple first ribs 50 to frame 40, coupling holes may be formed in first side plate 41 and second side plate 42 of frame 40, and then first ends 50b and second ends 50a of first ribs 50 may be inserted into the coupling holes. Alternatively, a separate coupler, such as a bolt, or an adhesive agent may be used in order to couple first ribs 50 to frame 40.

A set of secondary batteries 10 is a chargeable and dischargeable battery assembly. Referring to FIG. 3, first end surfaces 10a and second end surfaces 10b of secondary batteries 10 may be exposed outside of frame 40 through openings of frame 40. First end surfaces 10a and second end surfaces 10b of secondary batteries 10 may function as terminals for electrically connecting secondary batteries 10 to external elements.

Referring to FIGS. 1 and 2, secondary batteries 10 are disposed approximately parallel to each other and spaced apart from each other and may constitute battery rows 20. For example, battery rows 20 may each correspond to a set of secondary batteries 10 that is vertically arranged between first side plate 41 and second side plate 42 (i.e., along a Z-axis direction) of FIGS. 1 through 3. Battery rows 20 are consecutively disposed adjacent to each other so as to constitute battery group 30. In FIG. 1, for convenience of illustration, only some of secondary batteries 10 are illustrated. Secondary batteries 10 corresponding to supporting grooves 51 formed in first ribs 50 may be, however, disposed in frame 40.

Since first ribs 50 are disposed between adjacent battery rows 20, a portion of an edge of one secondary battery 10 may be accommodated in each supporting groove 51. First ribs 50 extend in a direction in which battery rows 20 extend.

As illustrated in FIGS. 1 through 3, secondary batteries 10 are formed to have a cylindrical shape, and thus supporting grooves 51 each for accommodating a portion of an edge of one secondary battery 10 are formed to have curved surfaces corresponding to external circumferential surfaces of secondary batteries 10. The present embodiment is, however, not limited to the described shapes of secondary batteries 10 and supporting grooves 51, and thus secondary batteries 10 and supporting grooves 51 may have various shapes. For example, secondary batteries 10 may have a rectangular parallelepiped shape of which a sectional shape is a rectangle, and supporting grooves 51 may have an angular shape corresponding to rectangular parallelepiped shape.

Supporting grooves 51 may be formed offset from each other on both lateral surfaces of first ribs 50. That is, secondary batteries 10 included in adjacent battery rows 20 may be arranged in a zigzag form. Referring to FIG. 2, secondary batteries 10 may be arranged in a honey-comb shape by being offset from each other. Due to such an arrangement of secondary batteries 10, secondary batteries 10 are efficiently accommodated in a limited space in such a way that the number of secondary batteries 10 that may be accommodated may be maximized, and an air circulation space for cooling secondary batteries 10 may be ensured.

First ribs 50 may include ventilation paths 53 for circulating air. Ventilation paths 53 are formed adjacent to frame 40 and adjacent to first ends 50b or second ends 50a. Frame 40 may include a plurality of ventilation holes 40a and 40b for circulating air into and out of frame 40.

Ventilation holes 40a are formed in first side plate 41 and are connected to ventilation paths 53 of first ribs 50. Thus, as illustrated in FIG. 3, air in frame 40 that is heated by contacting surfaces of secondary batteries 10 may be discharged out of frame 40 through ventilation paths 53 and ventilation holes 40a. On the other hand, air outside of frame 40 may be introduced to frame 40 through ventilation holes 40a, and then the introduced air may flow over surfaces of secondary batteries 10 through ventilation paths 53 so as to cool secondary batteries 10.

Referring to FIGS. 2 and 3, first connection taps 91 and second connection taps 92 for electrically connecting first and second end surfaces 10a and 10b of secondary batteries 10, which are externally exposed, may be installed on opposite sides of frame 40. First connection taps 91 and second connection taps 92 may be electrically connected to secondary batteries 10 by welding first connection taps 91 and second connection taps 92 respectively on first and second end surfaces 10a and 10b of secondary batteries 10.

Supporting protrusions 80 that extend over supporting grooves 51 by a predetermined distance so as to support portions of first and second end surfaces 10a and 10b of secondary batteries 10 may be installed on first ribs 50. Supporting protrusions 80 may be previously formed, and then may be coupled to first ribs 50, or alternatively, may be formed integrated with first ribs 50 during manufacturing of first ribs 50 by using an injection molding method.

Frame 40 may include protrusion flanges 41b and 42b that extend from edges of frame 40 over the outermost secondary batteries 10 of battery group 30 by a predetermined distance. Protrusion flanges 41b and 42b support portions of first and second end surfaces 10a and 10b of the outermost secondary batteries 10.

During manufacturing of the battery pack according to the present embodiment, when secondary batteries 10 are inserted into supporting grooves 51 of first ribs 50, secondary batteries 10 are stably supported by protrusion flanges 41b and 42b and supporting protrusions 80. Thus, first connection taps 91 and second connection taps 92 may then be stably welded on secondary batteries 10. In addition, when the battery pack is used, stable assembly of secondary batteries 10 may be maintained by frame 40 and first ribs 50.

First external surfaces 58 of first ribs 50 correspond to first end surfaces 10a of secondary batteries 10 and are inwardly spaced apart from a first side surface 48 of frame 40. In addition, second external surfaces 59 of first ribs 50 correspond to second end surfaces 10b of secondary batteries 10 and are inwardly spaced apart from a second side surface 49 of frame 40. First and second side surface 48 and 49 respectively correspond to first and second end surfaces 10a and 10b of the secondary batteries.

As such, the Y-axis direction length of first rib 50 is smaller than the Y-axis direction length of frame 40, and thus the material cost of the battery pack may be reduced and the battery pack may be lighter. In addition, an air circulation space for efficiently cooling the secondary batteries 10 may be ensured.

Figure 4:
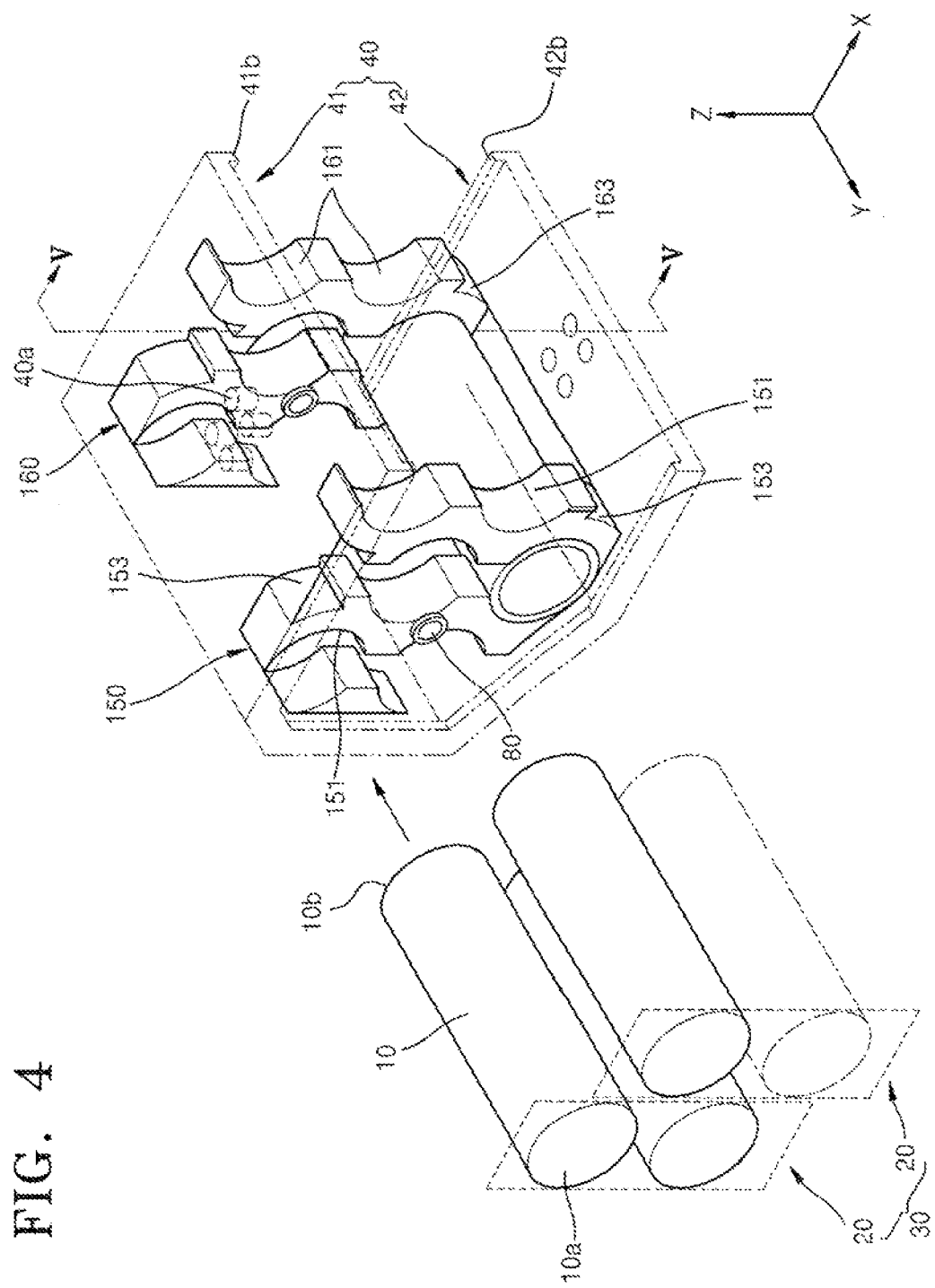
FIG. 4 is a partial oblique view of a battery pack constructed as another embodiment according to the principles of the present invention.
Figure 5:
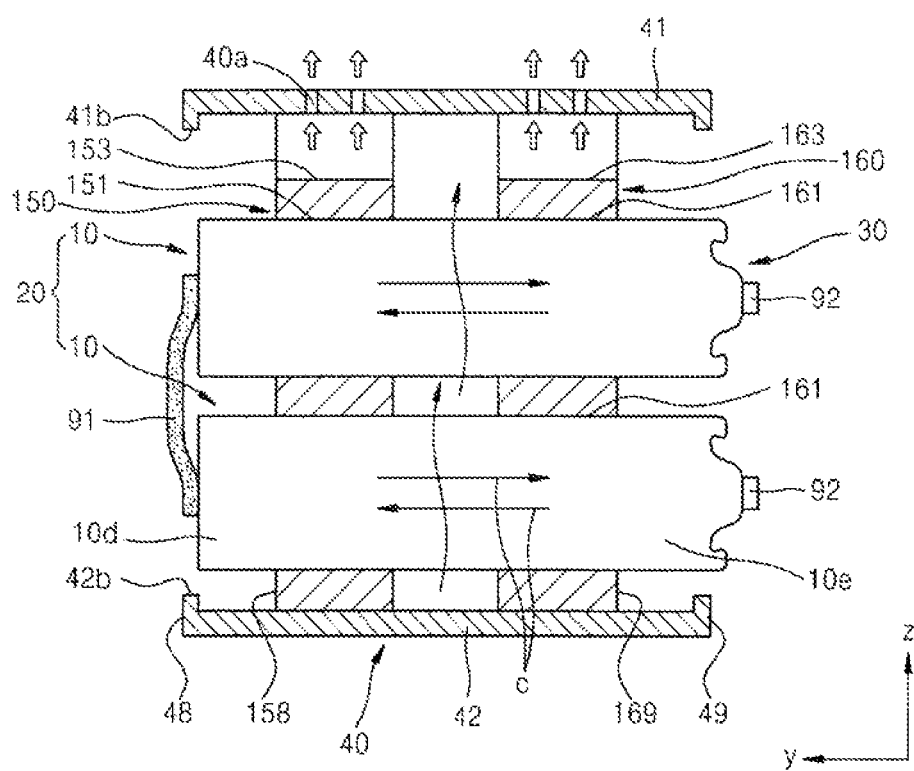
FIG. 5 is a cross-sectional view of the battery pack taken along sectional line V-V of FIG. 4, for explaining a state in which assembling of the battery pack of FIG. 4 is completed.

FIG. 4 is a partial oblique view of a battery pack constructed as another embodiment according to the principles of the present invention. FIG. 5 is a cross-sectional view of the battery pack taken along a line V-V of FIG. 4, for explaining a state in which assembling of the battery pack of FIG. 4 is completed.

The battery pack according to the present embodiment includes battery group 30 including secondary batteries 10, frame 40 surrounding battery group 30, and first ribs 150 installed on frame 40 so as to support secondary batteries 10.

The battery pack according to the present embodiment is formed by modifying the battery pack of FIGS. 1 through 3. That is, in FIGS. 4 and 5, first ribs 150 and second ribs 160 are installed on frame 40. Hereinafter, like reference numerals refer to the like elements.

Frame 40 includes first side plate 41 as an upper plate in FIGS. 4 and 5, second side plate 42 corresponding to first side plate 41, and lateral plates. For convenience of illustration, the lateral plates are not illustrated. Ventilation holes 40a are formed in first side plate 41 and second side plate 42. Frame 40 includes protrusion flanges 41b and 42b. Protrusion flanges 41b and 42b are respectively formed on first side plate 41 and second side plate 42 and support end surfaces of secondary batteries 10.

Secondary batteries 10 are disposed approximately parallel to each other and spaced apart from each other in a predetermined direction (i.e., a Z-axis direction) and may constitute battery rows 20. Battery rows 20 are consecutively disposed adjacent to each other so as to constitute battery group 30. Battery group 30 is surrounded by frame 40.

Referring to FIG. 5, first ribs 150 support edges of first end portions 10d of secondary batteries 10, and second ribs 160 support edges of second end portions 10e of secondary batteries 10.

First ribs 150 and second ribs 160 are disposed between adjacent battery rows 20. First ribs 150 and second ribs 160 may respectively include supporting grooves 151 and 161 for accommodating portions of edges of secondary batteries 10. Supporting grooves 151 and 161 may be arranged in a zigzag form.

First ribs 150 and second ribs 160 may respectively include ventilation paths 153 and 163 for circulating air. Ventilation paths 153 and 163 are formed adjacent to ends of first and second ribs 150 and 160 and adjacent to frame 40.

First connection taps 91 and second connection taps 92 for electrically connecting end surfaces of secondary batteries 10 may be installed on opposite sides of frame 40. First connection taps 91 and second connection taps 92 may be welded on the end surfaces of secondary batteries 10.

Referring to FIG. 5, first external surfaces 158 of first ribs 150 correspond to first end surfaces 10a of secondary batteries 10 and are inwardly spaced apart from first side surface 48 of frame 40. In addition, second external surfaces 169 of second rib 160 correspond to second end surfaces 10b of secondary batteries 10 and are inwardly spaced apart from second side surface 49 of frame 40.

As such, the Y-axis direction distance from first external surfaces 158 of first ribs 150 to second external surfaces 169 of second ribs 160 is smaller than the Y-axis direction length of frame 40, and thus the material cost of the battery pack according to the present embodiment may be reduced and the battery pack may be lighter. In addition, an air circulation space for efficiently cooling secondary batteries 10 may be ensured.

Ventilation holes 40a formed in frame 40 are connected to ventilation paths 153 and 163 of first ribs 150 and second ribs 160. Thus, air in frame 40 that is heated by contacting surfaces of secondary batteries 10 may be discharged out of frame 40 through ventilation holes 40a, and air outside of frame 40 may be introduced to frame 40 through ventilation holes 40a so as to cool secondary batteries 10.

In the battery pack according to the present embodiment, since first ribs 150 and second ribs 160 are spaced apart from each other, an air circulation space for efficiently cooling secondary batteries 10 between first ribs 150 and second ribs 160 is provided. Thus, air may circulate in directions (e.g., a Y-axis direction) indicated by arrows 'C' of FIG. 5, thereby efficiently cooling secondary batteries 10.

Figure 6:
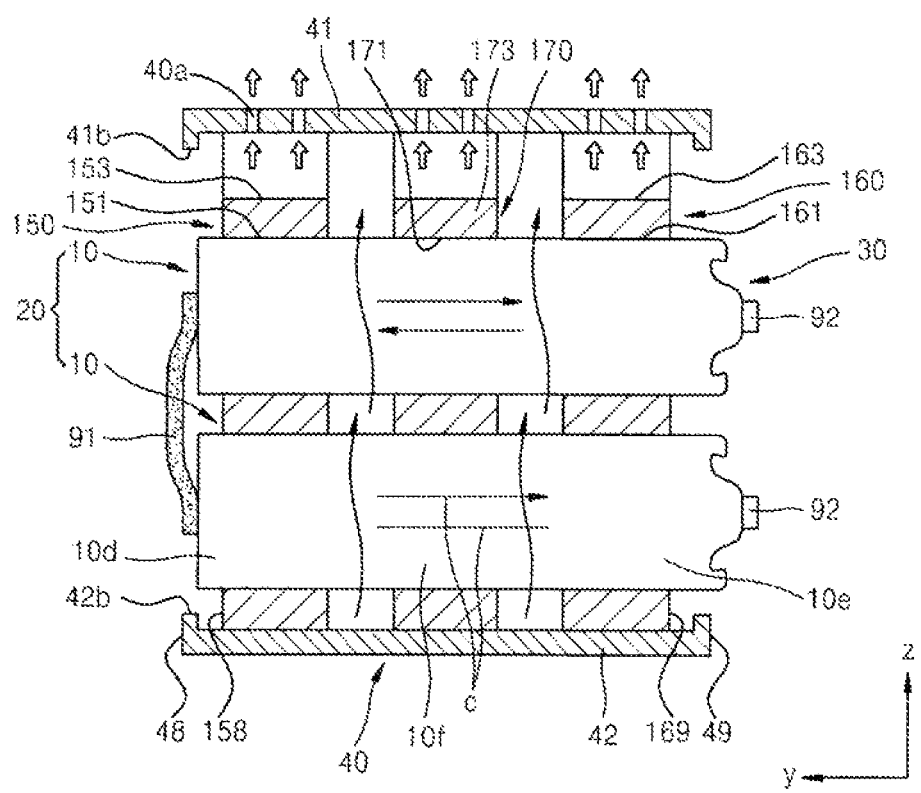
FIG. 6 is a cross-sectional view of a battery pack constructed as another embodiment according to the principles of the present invention.

FIG. 6 is a cross-sectional view of a battery pack constructed as still another embodiment according to the principles of the present invention.

The battery pack of FIG. 6 is similar to the battery pack of FIGS. 4 and 5. However, the battery pack of FIG. 6 is different from the battery pack of FIGS. 4 and 5 in that third ribs 170 is disposed between first ribs 150 and second ribs 160.

First ribs 150 support edges of first end portions 10d of secondary batteries 10, second ribs 160 support edges of second end portions 10e of secondary batteries 10, and third ribs 170 support intermediate portions 10f of secondary batteries 10.

Since third ribs 170 has a structure similar to those of first ribs 150 and second ribs 160, third ribs 170 are also disposed between adjacent battery rows 20, and extends in a direction in which battery rows 20 extend. In addition, third ribs 170 include supporting grooves 171 that are formed in lateral surfaces thereof, and accommodate portion of edges of secondary batteries 10. Ends of third ribs 170 are coupled to frame 40. In addition, ventilation paths 173 for circulating air may be formed adjacent to the ends of third ribs 170 coupled to frame 40.

As such, in order to support secondary batteries 10, first ribs 150, second ribs 160, and third ribs 170 are used, and thus secondary batteries 10 may be stably supported. In addition, since an air circulation space may be ensured between first ribs 150, second ribs 160, and third ribs 170, secondary batteries 10 may be efficiently cooled.

As described above, according to the one or more of the above embodiments of the present invention, in a battery pack, since secondary batteries may be stably supported by ribs formed on a frame, stable assembly of the secondary batteries may be maintained in the battery pack. Since an air circulation space may be ensured by the ribs supporting the secondary batteries, the secondary batteries may be efficiently cooled. In addition, since the secondary batteries supported by the ribs may be connected to connection taps, an assembling operation may be easily performed.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A battery pack comprising:
   a frame comprising a first side plate and a second side plate spaced-apart from the first side plate;
   a plurality of first ribs disposed spaced-apart from each other along a first direction, each first rib having opposite ends respectively coupled to the first and second side plates and comprising supporting grooves formed in lateral surfaces extending between the opposite ends, any portion of said each first rib not directly contacting, any portion of another first rib which is immediately adjacent to said each first rib; and
   a battery group comprising battery rows each including a plurality of secondary batteries, the secondary batteries inserted along a direction perpendicular to the first direction in spaces formed by the supporting grooves of adjacent first ribs, each of said plurality of secondary batteries having a cylindrical shape, and the supporting grooves are formed offset from each other on the lateral surfaces of the first ribs so that no two adjacent batteries of said plurality of secondary batteries are in a same geometric plane in both a horizontal axis and vertical axis; and
   first connection taps for electrically connecting portions of first end portions of the secondary batteries, said first connection taps consisting of a rhombus shape with four straight sides of equal length, opposite sides that are parallel and opposite angles that are equal with no angles being right angles.

2. The battery pack of claim 1, wherein each of external surfaces of the first ribs is inwardly spaced apart from each of side surfaces of the frame.

3. The battery pack of claim 1, wherein the secondary batteries of a same battery row are disposed spaced-apart from each other.

4. The battery pack of claim 1, wherein adjacent first ribs comprise a ventilation path interposed between the adjacent first ribs for circulating air, and the ventilation paths are connected to the ends of the first ribs and connected to the frame.

5. The battery pack of claim 4, wherein the frame comprises a plurality of ventilation holes for connecting air inside of the frame and air outside of the frame.

6. The battery pack of claim 1, wherein the secondary batteries have a cylindrical shape, and
   wherein each supporting groove has a curved shape corresponding to a portion of an external circumferential surface of one secondary battery.

7. The battery pack of claim 1, further comprising a plurality of second ribs that are each disposed between adjacent battery rows at second end portions of the secondary batteries and that correspond to the first ribs,
   wherein the second ribs comprise supporting grooves that are formed in lateral surfaces of the second ribs and accommodate edges of the second end portions of the secondary batteries, and ends of the second rib are coupled to the frame, and
   wherein the first ribs support edges of first end portions of the secondary batteries.

8. The battery pack of claim 7, wherein the first ribs and the second ribs extend in a direction in which the battery rows extend.

9. The battery pack of claim 7, wherein the supporting grooves are formed offset from each other on the lateral surfaces of the first and second ribs, and
   wherein the secondary batteries of adjacent battery rows are arranged in a zigzag form.

10. The battery pack of claim 7, wherein each of the first ribs and the second ribs comprises ventilation paths for circulating air, and the ventilation paths are formed at ends of the first ribs and the second ribs and connected to the frame.

11. The battery pack of claim 10, wherein the frame comprises a plurality of ventilation holes connecting air inside of the frame and air outside of the frame.

12. The battery pack of claim 7, wherein first external surfaces of the first ribs correspond to first end portions of the secondary batteries and are inwardly spaced apart from a first side surface of the frame corresponding to the first end portions of the secondary batteries, and
   wherein second external surfaces of the second ribs correspond to second end portions of the secondary batteries and are inwardly spaced apart from a second side surface of the frame corresponding to the second end portions of the secondary batteries.

13. The battery pack of claim 7, further comprising a plurality of third ribs that are each disposed at intermediate portions of the secondary batteries and correspond to the first ribs and the second ribs, wherein the third ribs comprise supporting grooves for supporting portions of edges of the secondary batteries, and ends of the third ribs are coupled to the frame.

14. The battery pack of claim 1, further comprising second connection taps for electrically connecting portions of second end portions of the secondary batteries.

15. The battery pack of claim 1, further comprising supporting protrusions that are coupled to external surfaces of the first ribs, wherein the supporting protrusions extend over the supporting, grooves so as to support portions of first end portions of the secondary batteries.

* * * * *